(12) United States Patent
Luo et al.

(10) Patent No.: US 8,404,129 B1
(45) Date of Patent: Mar. 26, 2013

(54) METHOD AND SYSTEM FOR PROVIDING A CURVED SURFACE IN A MAGNETIC RECORDING HEAD

(75) Inventors: Guanghong Luo, Fremont, CA (US); Danning Yang, Fremont, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 428 days.

(21) Appl. No.: 12/751,815

(22) Filed: Mar. 31, 2010

(51) Int. Cl.
*B44C 1/22* (2006.01)

(52) U.S. Cl. .............. 216/22; 216/24; 216/26; 216/88; 216/89; 438/689; 438/690; 438/691; 438/692

(58) Field of Classification Search .......... 438/689–692; 216/22, 24, 26, 88.89; 359/484
See application file for complete search history.

(56) References Cited

U.S. PATENT DOCUMENTS

| | | | |
|---|---|---|---|
| 6,214,734 B1 * | 4/2001 | Bothra et al. | 438/692 |
| 7,364,667 B2 * | 4/2008 | Minamihaba et al. | 252/79.1 |
| 8,116,034 B2 * | 2/2012 | Komura et al. | 360/125.31 |
| 2003/0085196 A1 | 5/2003 | Coppeta | |
| 2003/0136759 A1 * | 7/2003 | Mikolas | 216/26 |
| 2004/0174596 A1 | 9/2004 | Umeki | |

OTHER PUBLICATIONS

Chen et al. Journal of Polymer Research, vol. 6, No. 3, 197-202, Jul. 1999.*

* cited by examiner

*Primary Examiner* — Duy Deo
*Assistant Examiner* — Maki Angadi (57) ABSTRACT

A method and system for fabricating an optical component are described. The method and system include providing a first planarization stopping and a second planarization stopping structure. The first planarization stopping structure has a first height and a first edge. The second planarization stopping structure has a second height different from the first height and a second edge. The first edge is separated from the second edge by a distance. The method and system also include providing an optical material. The optical material resides at least between the first edge of the first planarization stopping structure and the second edge of the second planarization stopping structure. The method and system also include planarizing the optical components. The planarization removes a portion of the optical material to form a surface between the first planarization stopping structure and the second planarization stopping structure. This surface has a curvature.

23 Claims, 8 Drawing Sheets

METHOD AND SYSTEM FOR PROVIDING A CURVED SURFACE IN A MAGNETIC RECORDING HEAD

BACKGROUND

Components having curved surfaces may be used in a number of applications for magnetic recording heads. For example, in conventional energy-assisted magnetic recording (EAMR) technology, laser light is used to introduce energy to a small region of the media, heating the region. The increase in temperature causes the region to be less magnetically ordered and facilitates writing to the region. This reduction in magnetic ordering assists the EAMR head in writing to the region using magnetic fields. In order to collimate or redirect the laser light to be provided to the media, lenses and/or mirrors are typically used in EAMR heads. Such components often have convex or concave surfaces. Similarly, the write poles for EAMR or other heads, such as perpendicular magnetic recording (PMR) heads may have leading and/or trailing edge bevels. As a result, the portion of the pole tip at the air-bearing surface (ABS) is smaller than part of the write pole distal from the ABS. Such bevels may also have curved surfaces.

Various methods may be employed to fabricate the conventional curved surfaces, such as conventional lenses. For example, lenses may be individually polished and then individually mounted in an EAMR head. Although fabrication using such conventional methods is possible, each lens is typically very small. Thus, individual fabrication of lenses may be time consuming and complex. Consequently, other mechanisms for forming the optical and other components having curved surfaces are desired. Accordingly, what is needed is an improved method for fabricating a curved surface, such as a lens, for a magnetic recording head.

SUMMARY

A method and system for fabricating an optical component or other component having a curved surface are described. The method and system include providing a first planarization stopping and a second planarization stopping structure. The first planarization stopping structure has a first height and a first edge. The second planarization stopping structure has a second height different from the first height and a second edge. The first edge is separated from the second edge by a distance. The method and system also include providing an optical or other material. The optical or other material resides at least between the first edge of the first planarization stopping structure and the second edge of the second planarization stopping structure. The method and system also include planarizing the optical or other components. The planarization removes a portion of the optical or other material to form a surface between the first planarization stopping structure and the second planarization stopping structure. This surface has a curvature.

DETAILED DESCRIPTION OF THE PREFERRED EMBODIMENTS

Figure 1:
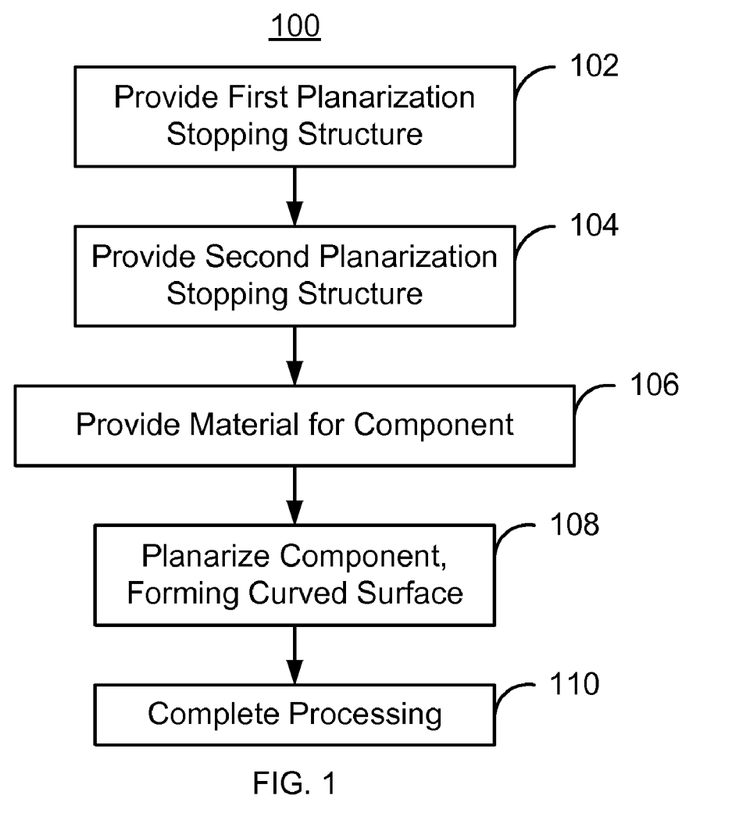
FIG. 1 is a flow chart depicting an exemplary embodiment of a method for fabricating a component having a curved surface.

FIG. 1 is a flow chart depicting an exemplary embodiment of a method 100 for fabricating a component having a curved surface. The method 100 is described in the context of a particular component, though other components might be so fabricated. For simplicity, some steps may be omitted, combined, and/or performed in another order. The component being fabricated may be used in a disk drive. For example, in some embodiments, the component may be a lens. In other embodiments, other components may be manufactured. For example, optical fibers, mirrors, bevels in poles, and/or other structures may be provided. The method 100 is also described in the context of providing a single component. However, the method 100 may be used to fabricate multiple components at substantially the same time. The method 100 and system are also described in the context of particular layers. However, in some embodiments, such layers may include multiple sub-layers. In one embodiment, the method 100 commences after formation of the underlayer(s) or other structures on the substrate on which the component is to reside.

A first planarization stopping structure having a first height and a first edge is provided, via step 102. The first planarization stopping structure may be a chemical mechanical planarization (CMP) stopping structure. For example, materials such as diamond-like carbon (DLC), Ta, Ru, Cr, SiC, amorphous carbon, and/or other material. In some embodiments, the first planarization stopping structure is a rectangular pillar of material. A second planarization stopping structure is provided, via step 104. The second planarization stopping structure may also be a CMP stopping structures. Materials such as DLC, Ru, Ta, SiC, amorphous carbon and/or other CMP stopping material(s) may be used. The second planarization stopping structure has a second height and a second edge. The second height is different from the first height. In some embodiments, the second height is less than the first height. The first edge and second edges are separated by a distance. In some embodiments, the distance separating the first and second edges is the width of the component.

A material for the component is provided, via step 106. At least some of the material is between the first edge of the first planarization stopping structure and the second edge of the second planarization stopping structure. The material may be blanket deposited such that the planarization stopping structures are covered after step 106 is completed. In other embodiments, material is only deposited between the planarization stopping structures. For example, the first and second planarization stopping structures may be masked prior to deposition of the material.

The component is planarized, via step 108. In some embodiments, step 108 includes performing a CMP on the component. Thus, a portion of the material is removed. In some embodiments, some of the first and planarization stopping structures may be removed. However, the amount removed may be significantly less than the material. The CMP is configured such that a portion of the surface exposed by the planarization between the first and second planarization stopping structures has a curvature. In some embodiments, the curvature is convex. In other embodiments, the curvature is concave. The desired curvature is achieved by controlling the planarization. For example, if a CMP is used, the hardness of the pad used and/or the pH of the slurry may be controlled to achieve the desired curvature. In general, lower removal rates of the material correspond to a more convex curvature. In some embodiments, removal rates of lower than two thousand Angstroms per minute are considered low, while removal rates of greater than four thousand Angstroms per minute are considered high. For example, if a hard pad, such as the Rodel IC1000, Hardness: 59 (Shore D) or other as a polyurethane pad of analogous hardness, is used, the removal rate may be high and the curvature may be concave. For a soft pad, such as Polytex series Hardness <15 (shore D), the removal rate may be low and the curvature may be convex. The pH of the slurry, table speed, downward force, and other aspects of a CMP or other planarization process to provide higher or lower removal rates, depending upon the curvature desired. In addition, the differences in heights and distances between the first and second planarization stopping structures may also be used to obtain the desired curvature and focal length.

Fabrication may then be completed, via step 110. In some embodiments, step 110 may include fabrication of subsequent structure in the disk drive, dicing and mounting component if the component was not fabricated in place, and/or other steps taken to prepare the component for use.

Using the method 100, a component for use in a magnetic recording disk drive and having a curved surface may be produced. Moreover, fabrication of such components may be reliably and relatively easily achieved by configuring accepted techniques, such as CMP.

Figure 2:
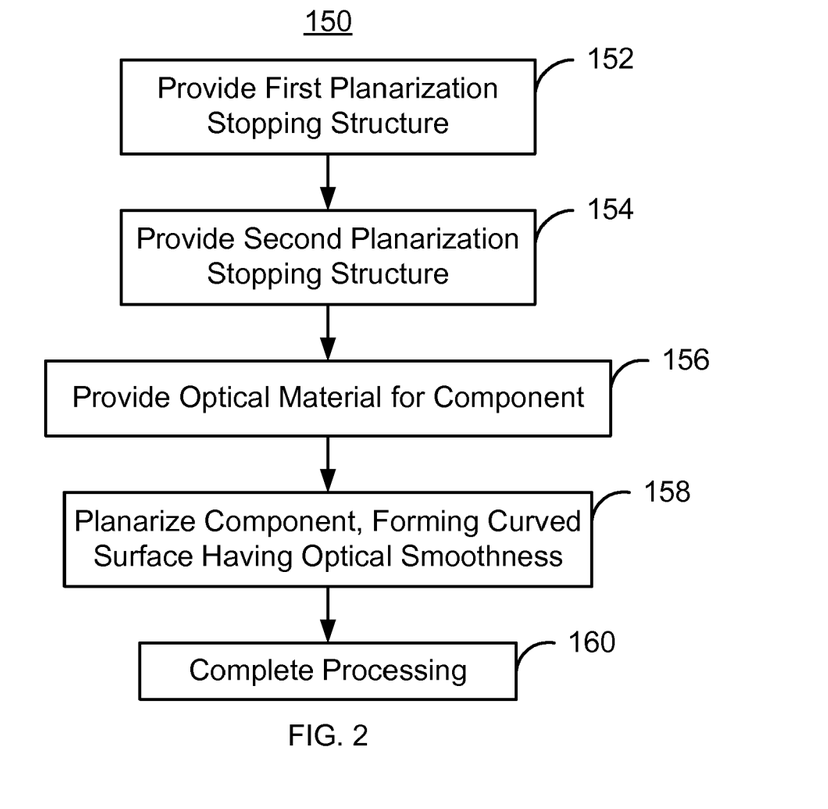
FIG. 2 is a flow chart depicting an exemplary embodiment of a method for fabricating an optical component.
Figure 3:
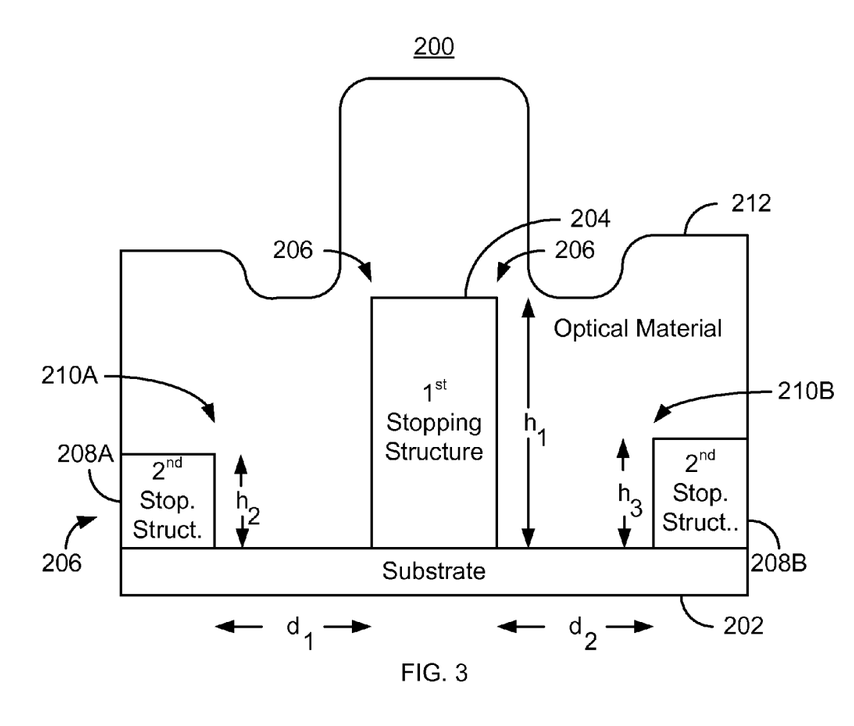
FIGS. 3-5 are a diagram depicting an exemplary embodiment of an optical component.
Figure 4:
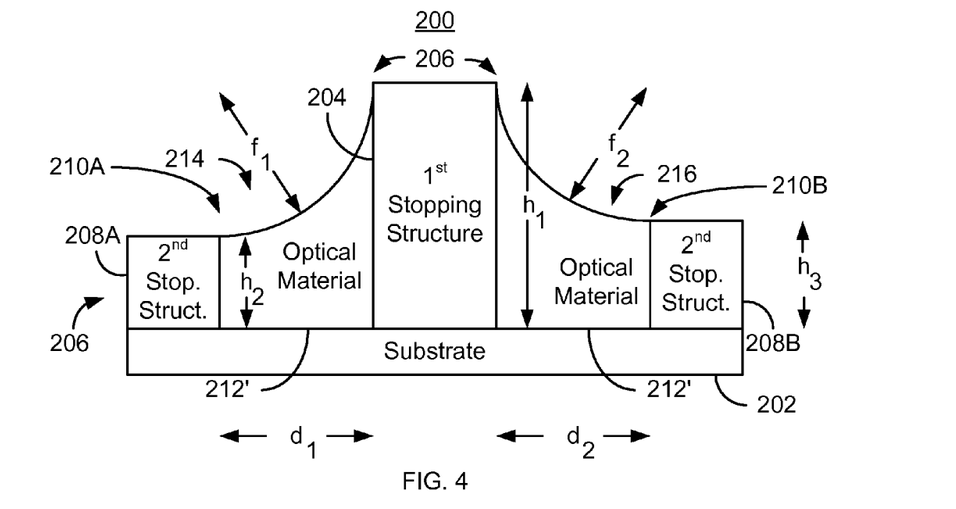
Figure 5:
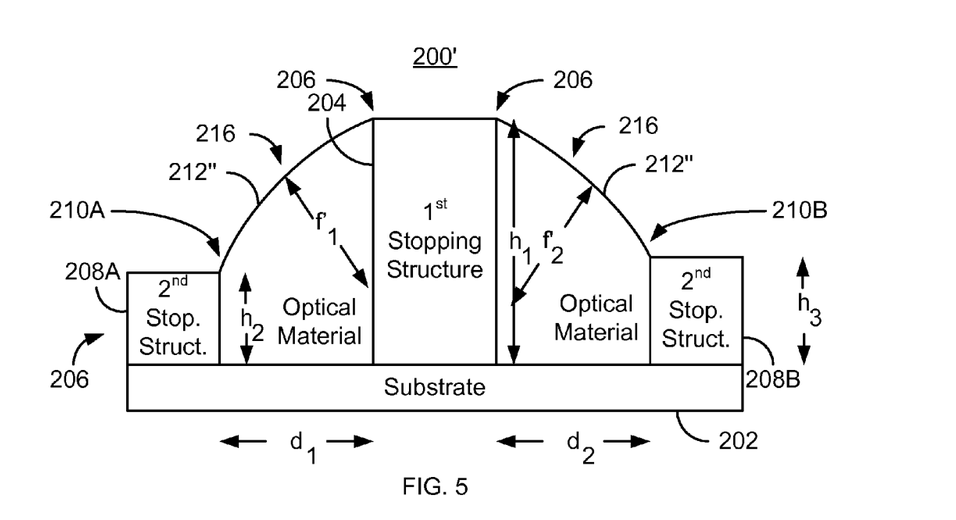

FIG. 2 is a flow chart depicting an exemplary embodiment of a method 150 for fabricating an optical component having a curved surface. The method 150 is described in the context of a particular component, though other components might be so fabricated. For simplicity, some steps may be omitted, combined, and/or performed in another order. FIGS. 3-5 depict embodiments of the optical component 200 formed using the method 150. For clarity, FIGS. 3-5 are not to scale and some feature may be omitted. The optical component 200 being fabricated may be used in a disk drive. For example, in some embodiments, the optical component 200 may be a lens. In other embodiments, other optical components (not shown) may be manufactured. For example, mirrors and/or other structures may be provided. The method 150 is also described in the context of providing a single component. However, the method 150 may be used to fabricate multiple components at substantially the same time. The method 150 and optical component 200 are also described in the context of particular layers. However, in some embodiments, such layers may include multiple sub-layers. In one embodiment, the method 150 commences after formation of the underlayer(s) or other structures on the substrate on which the component is to reside. For example, for a lens formed for an EAMR head, the lens may be formed on the slider already including the components of the EAMR head.

A first planarization stopping structure having a first height and a first edge is provided, via step 152. A second planarization stopping structure is provided, via step 154. The second planarization stopping structure has a second height and a second edge. The second height is different from the first height. In some embodiments, the second height is less than the first height. The first edge and second edges are separated by a distance. In some embodiments, the distance separating the first and second edges is the width of the optical component. Further, steps 152 and 154 may be carried out by depositing separate layers or depositing a single layer and removing portions of the layer. Finally, steps 152 and 154 are analogous to steps 102 and 104, respectively of the method 100.

The optical material(s) for the component are provided, via step 156. At least some of the material is between the first edge of the first planarization stopping structure and the second edge of the second planarization stopping structure. The optical material may be blanket deposited such that the planarization stopping structures are covered after step 156 is completed. In other embodiments, the optical material is only deposited between the planarization stopping structures. Step 156 is analogous to step 106.

FIG. 3 depicts an embodiment of the optical component 200 after step 156 has been performed. The substrate 202 and planarization stopping structures 204 and 208 are shown. The planarization stopping structures 204 and 208 may be CMP stopping structures that may include materials such as DLC, Ta, Ru, Cr, SiC, amorphous carbon, and/or other stopping material(s). However, the planarization stopping structure 204 and 208 need not be made from the same material. The first planarization stopping structure 204 has a height $h_1$ and edges 206. Thus, the first planarization stopping structure 204 may be a pillar of stopping material(s). The second planarization stopping structure 208 is shown as having two parts 208A and 208B. Each portion 208A and 208B has an edge 210A and 210B, respectively. In some embodiments, only one of the portions 208A and 208B might be formed. In other embodiments, 208A and 208B may be connected, surrounding the first planarization stopping structure 208. In other embodiments, the stopping structures 208A and 208B are pillars of planarization stopping material. The second planarization stopping structure 208A has a height $h_2$ that is different from $h_1$. In the embodiment shown, $h_2$ is less than $h_1$. However, in other embodiments, $h_2$ might be made greater than $h_1$. The second planarization stopping structure 208B has a height $h_3$ that is different from $h_1$ and $h_2$. In the embodiment shown, $h_3$ is less than $h_1$. However, in other embodiments, $h_3$ might be made greater than $h_1$. The heights $h_2$ and $h_3$ are shown as different. However, in other embodiments, the heights $h_2$ and $h_3$ may be the same. Further the edges 210A and 20B of the structures 208A and 208B, respectively, are shown distances $d_1$ and $d_2$, respectively from the edges 206 of the first structure 204. In the embodiment shown, $d_1$ and $d_2$ are the same. However, in other embodiments, $d_1$ and $d_3$ may differ. Optical material 212 is shown as blanket deposited for the optical component 200. The optical material 212 might include materials such as alumina and/or tantalum oxide.

The optical component is planarized, via step 158. In some embodiments, step 158 includes performing a CMP on the component. A portion of the optical material 212 is removed. In some embodiments, some of the first planarization stopping structure 204 and the second planarization stopping structure 208 may be removed. However, the amount removed is significantly less than the optical material 212. The planarization exposes a surface of the optical material 212. The planarization step is configured such that a portion of the surface exposed by the planarization between the first and second planarization stopping structures has a curvature. In some embodiments, the curvature is convex. In other embodiments, the curvature is concave. The desired curvature may be achieved by controlling the planarization and the geometry of the optical component 200. For example, if a CMP is used in step 158 and a concave shape is desired, harder pads such as the Rodel IC1000, Hardness: 59 (Shore D) or other pads such as a polyurethane pad, a slurry having a basic pH and/or a higher down force may be used to obtain a higher removal rate. This high removal rate may be greater than four thousand Angstroms per minute. Similarly, if a CMP is used and a convex shape is desired, softer pads such as Polytex series Hardness <15 (shore D), a slurry having a neutral pH and/or a lower down force may be used. This results in a low removal rate of lower than two thousand Angstroms per minute. Thus, the hardness of the pad used and/or the pH of the slurry may be controlled to achieve the desired curvature. Other parameters such as the table speed, downward force, and other aspects of a CMP may be used to provide the desired curvature. In addition, the differences in heights, $h_1$, $h_2$, and $h_3$ and distances, $d_1$ and $d_2$, between the first and second planarization stopping structures 204 and 206 may also be used to obtain the desired curvature. Fabrication may then be completed, via step 160. In some embodiments, step 160 may include mounting the optical component. However, in other embodiments, the optical component 200 is formed on the slider, at its final location.

FIG. 4 depicts one embodiment of the optical component 200 after fabrication is complete. Thus, portions of the optical material 212 have been removed, leaving material 212' having curved surfaces 214 and 216. In addition, the planarization of step 158 was configured to have a high removal rate. The exposed surfaces 214 and 216 are, therefore, concave. Further, by tailoring the distances $d_1$ and $d_2$, the height differences $h_1$-$h_2$ and $h_1$-$h_3$, and parameters of the planarization, the desired focal lengths, $f_1$ and $f_2$, may be achieved. FIG. 5 depicts another embodiment of the optical component 200' after fabrication is complete. Thus, portions of the optical material 212 have been removed, leaving material 212". In addition, the planarization of step 158 was configured to have a low removal rate. As a result, the exposed surfaces 214' and 216' are convex. Thus, focal lengths $f_1$' and $f_2$' may be different from $f_1$ and $f_2$.

Using the method 150, optical components such as lenses, for use in a magnetic recording disk drive may be fabricated. The lenses may have the desired curvature, or focal length. The curved surfaces 214 and 216 may have a surface smoothness having a root mean square (RMS) variation of less than ten Angstroms. Such a smoothness is sufficient for optical applications. Moreover, fabrication of such components may be reliably and relatively easily achieved by configuring accepted techniques, such as CMP.

Figure 6:
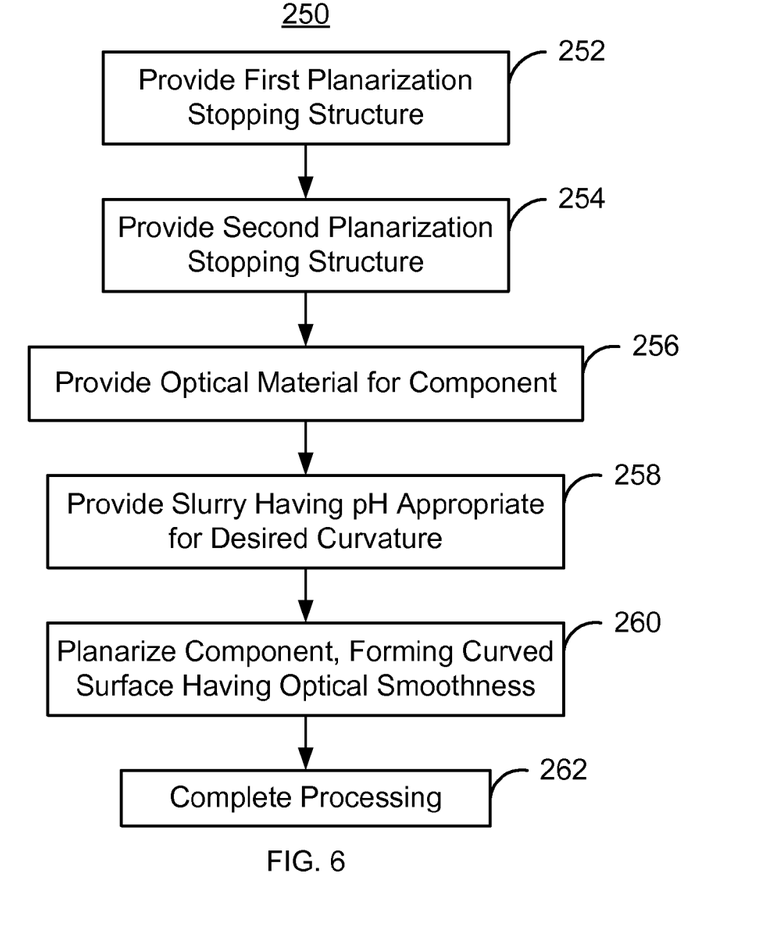
FIG. 6 is a flow chart depicting another exemplary embodiment of a method for fabricating an optical component.

FIG. 6 is a flow chart depicting another exemplary embodiment of a method 250 for fabricating an optical component to be used in a disk drive. The method 250 is described in the context of a lens. However, other components might be so fabricated. For simplicity, some steps may be omitted, combined, and/or performed in another order. FIGS. 7-11 depict embodiments of the lens 300 formed using the method 250. For clarity, FIGS. 7-11 are not to scale and some feature may be omitted. The method 250 is also described in the context of providing a lens 300. However, the method 250 may be used to fabricate multiple components at substantially the same time. The method 250 and lens 300 are also described in the context of particular layers. However, in some embodiments, such layers may include multiple sub-layers. In one embodiment, the method 250 commences after formation of the EAMR transducer and other structures on the slider.

A first CMP stopping structure having a first height and a first edge is provided, via step 252. A second CMP stopping structure is provided, via step 254. The second planarization stopping structure has a second height and a second edge. Steps 252 and 254 are analogous to steps 102/152 and 104/154, respectively. Further, steps 252 and 254 may be carried out by depositing separate layers or depositing a single layer and removing portions of the layer.

Figure 7:
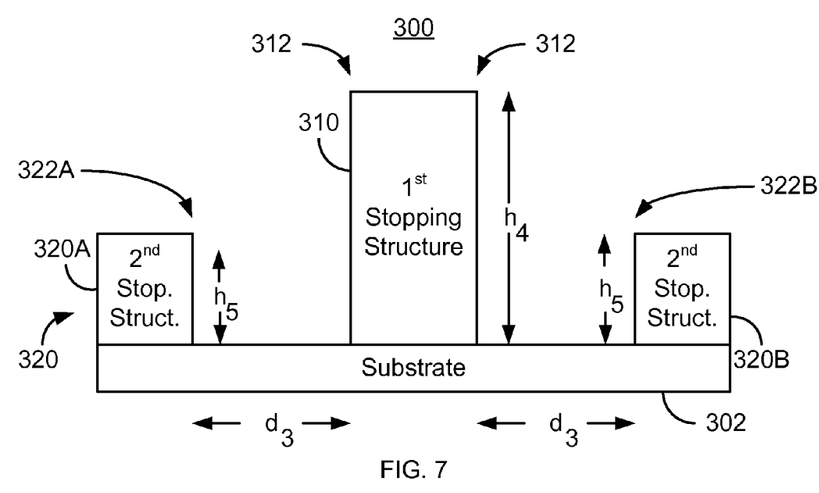
FIGS. 7-12 are diagrams depicting an exemplary embodiment of an optical component during fabrication.

FIG. 7 depicts the lens 300 after step 254 is performed. Thus, first CMP stopping structure 310 and second CMP stopping structure 320 are shown on the substrate 302. In some embodiments, the substrate is a slider on which an EAMR transducer has been fabricated. The CMP stopping structures 310 and 320 may include materials such as DLC, Ta, Ru, Cr, SiC, amorphous carbon, and/or other stopping material(s), but need not be made from the same material. The first CMP stopping structure 310 has a height $h_4$, edges 312, and may be a rectangular pillar. The second CMP stopping structure 320 has two parts 320A and 320B. Each portion 320A and 320B has an edge 322A and 322B, respectively. The second planarization stopping structure 320 has a height $h_5$ that is different from $h_4$. In the embodiment shown, $h_5$ is less than $h_4$. However, in other embodiments, $h_5$ might be made greater than $h_4$. Further the edges 322A and 322B of the structures 320A and 320B, respectively, are shown distance $d_3$ from the edges 312 of the first structure 310.

Figure 8:
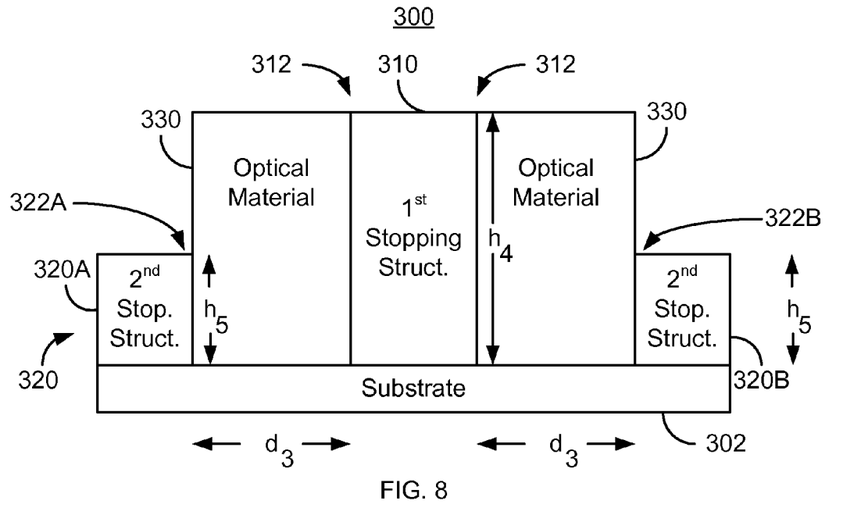

The optical material(s) for the lens 300 are provided, via step 256. Step 256 may include depositing aluminum oxide, tantalum oxide, and/or other optical material(s) appropriate for a lens. Step 256 is analogous to steps 106 and 156. FIG. 8 depicts the lens 300 after step 256 is performed. Thus, the optical material is between the first edge 312 of the first CMP stopping structure 310 and the second edge 322A/322B of the second planarization stopping structure 320.

A slurry having a pH corresponding to the desired curvature of the optical material 330 is provided, via step 258. In some embodiments, the slurry has a basic pH if the lens 300 is to have a concave curvature. In other embodiments, the slurry provided in step 258 has a neutral pH if the surface is to have a convex curvature.

A CMP is performed on the lens 300, via step 260. The CMP removes a portion of the lens material 330 and form the surface between the first CMP stopping structure 210 and the second CMP stopping structure 320. The CMP uses the slurry provided in step 258. Thus, the CMP is configured to provide the desired curvature. In addition to using the appropriate slurry, the table speed, down force, and hardness of the pad used, other aspects of the CMP may be tailored to obtain the desired curvature. More specifically, a low removal rate may result in a lens having a more convex curvature, while a high removal rate may result in a concave lens. Thus, the configuration of the CMP may be used to provide the desired curvature. Fabrication may then be completed, via step 262. In some embodiments, step 262 may include mounting the optical component. However, in other embodiments, the lens 300 is formed on the slider, at its final location.

Figure 9:
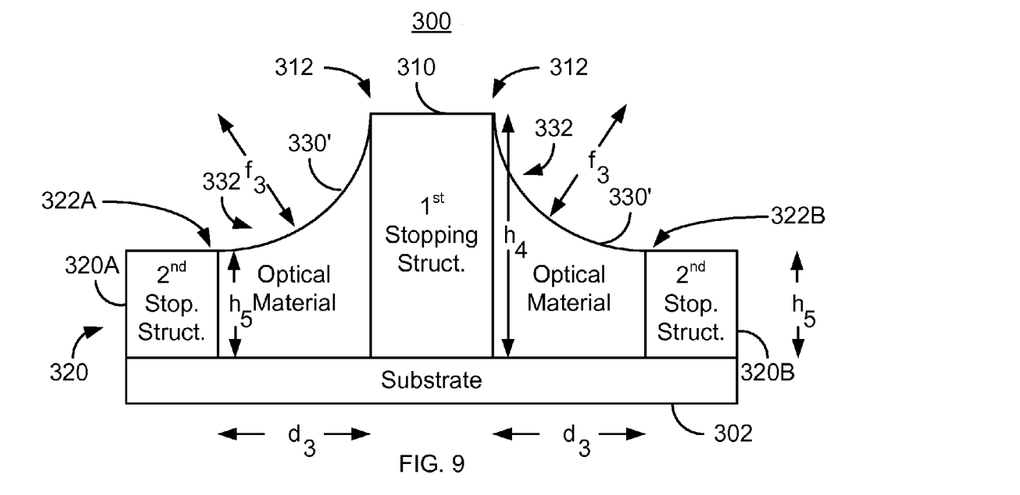
Figure 10:
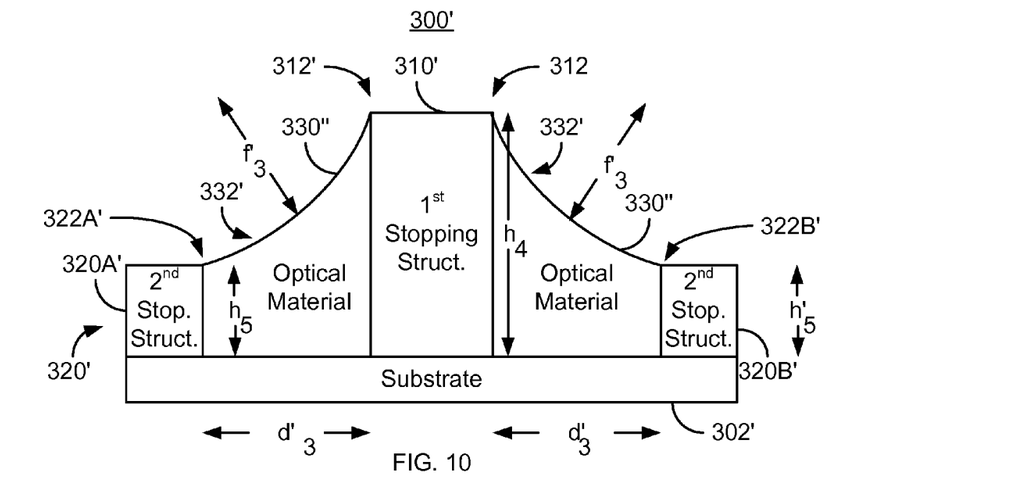
Figure 11:
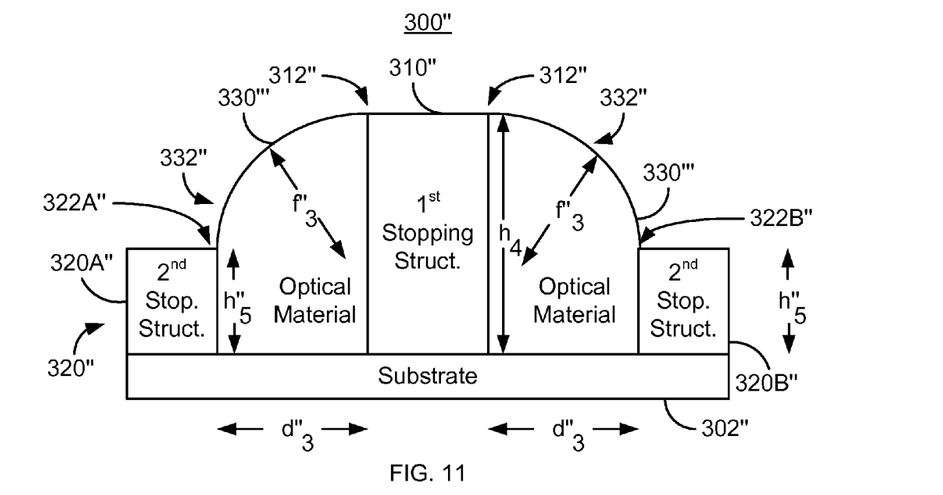
Figure 12:
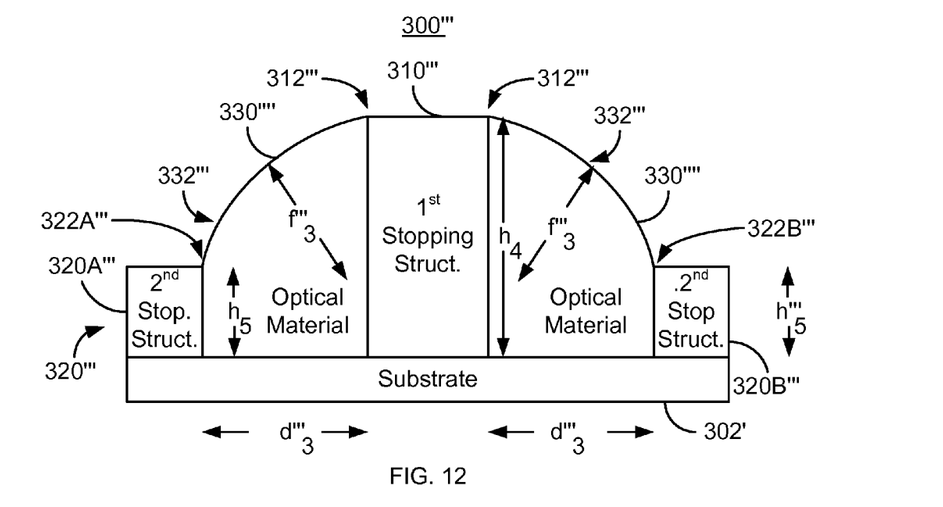

FIGS. 9-12 each depicts one embodiment of the lens 300, 300', 300", and 300'" after fabrication is complete. Thus, portions of the optical material 330 have been removed, leaving material 330', 330", 330'", and 330"" having curved surfaces 332, 332', 332", and 332'" and curved surfaces 334, 334', 334", and 334'". In FIGS. 9-10, the planarizations of step 260 were configured to have high removal rates, for example above four thousand Angstroms per minute. The exposed surfaces 332/332' and 334/334' are, therefore, concave. In addition, because the distances $d_3$ and $d_3$', the height differences $h_4$-$h_5$ and $h_4$'-$h_5$' between the structures 310/310' and 320/320' and parameters of the planarization, the different desired focal lengths, $f_3$ and $f_3$', may be achieved. In FIGS. 11-12, the planarizations of step 260 were configured to have low removal rates, for example below two thousand Angstroms per minute. The exposed surfaces 332"/332'" and 334"/334'" are, therefore, convex. In addition, because the distances $d_3$" and $d_3$'", the height differences $h_4$"-$h_5$" and $h_4$'"-$h_5$'" between the structures 310"/310'" and 320"/320'", and parameters of the planarization, the different desired focal lengths, $f_3$" and $f_3$'", may be achieved.

Using the method 250, optical components such as lenses, for use in a magnetic recording disk drive may be fabricated.

The lenses 300, 300', 300", and 300'" may have the desired curvature, or focal length. The curved surfaces 332, 332', 332", 332'" may have a surface smoothness having a RMS variation of less than ten Angstroms. Such a smoothness is sufficient for optical applications. Moreover, fabrication of such components for magnetic recording heads, such as EAMR heads, may be reliably and relatively easily achieved by configuring accepted techniques, such as CMP.

We claim:

1. A method for fabricating an optical component comprising:
   providing a first planarization stopping structure having a first height and a first edge;
   providing a second planarization stopping structure having a second height different from the first height and a second edge, the first edge being separated from the second edge by a distance;
   providing an optical material residing at least between the first edge of the first planarization stopping structure and the second edge of the second planarization stopping structure;
   planarizing the optical component, the planarizing removing a portion of the optical material to form a surface between the first planarization stopping structure and the second planarization stopping structure and having a curvature, the planarization using a slurry having a basic pH if the curvature of the surface formed is a concave curvature, the planarization using the slurry having a neutral pH if the curvature of the surface formed has a convex curvature.

2. The method of claim 1 wherein the curvature is the convex curvature.

3. The method of claim 2 wherein the step of performing the planarization further includes:
   performing a chemical mechanical planarization (CMP) with the slurry having the neutral pH.

4. The method of claim 3 wherein the CMP uses a soft pad.

5. The method of claim 1 wherein the curvature is the concave curvature.

6. The method of claim 5 wherein the step of performing the planarization further includes:
   performing a chemical mechanical planarization (CMP) with the slurry having the basic pH.

7. The method of claim 6 wherein the CMP uses a hard pad.

8. The method of claim 7 wherein the hard pad includes polyurethane.

9. The method of claim 1 wherein the optical material includes at least one of alumina and tantalum oxide.

10. The method of claim 1 wherein the first planarization stopping structure includes at least one of diamond-like carbon, Ru, Ta, SiC, amorphous carbon.

11. The method of claim 1 wherein the second planarization stopping structure include at least one of diamond-like carbon, Ru, Ta, SiC, amorphous carbon.

12. The method of claim 1 further comprising:
   providing a portion of an energy assisted magnetic recording (EAMR) head, the first stopping structure, the second stopping structure and the optical material being formed on the portion of the EAMR head.

13. The method of claim 1 wherein the planarization uses a hard pad if the curvature of the surface formed is a concave curvature and wherein the planarization uses a soft pad if the curvature of the surface formed has a convex curvature.

14. A method for fabricating an optical component in a magnetic recording head comprising:
   providing a first planarization stopping structure having a first height and a first edge;
   providing a second planarization stopping structure having a second height different from the first height and a second edge, the first edge being separated from the second edge by a distance;
   providing an optical material residing at least between the first edge of the first planarization stopping structure and the second edge of the second planarization stopping structure;
   providing a slurry having a basic pH if a surface of the optical material is to have a concave curvature and a neutral pH if the surface is to have a convex curvature;
   performing a chemical mechanical planarization (CMP) on the optical component to remove a portion of the optical material and form the surface between the first planarization stopping structure and the second planarization stopping structure, the CMP using the slurry having the basic pH and a hard pad if the surface formed has the concave curvature, the CMP using the slurry having the neutral pH and the soft pad if the surface formed has the convex curvature.

15. A method for fabricating a component of a magnetic recording head comprising:
   providing a first planarization stopping structure having a first height and a first edge;
   providing a second planarization stopping structure having a second height different from the first height and a second edge, the first edge being separated from the second edge by a distance;
   providing a material for the component residing at least between the first edge of the first planarization stopping structure and the second edge of the second planarization stopping structure;
   planarizing the component, removing a portion of the material to form a surface having a curvature between the first planarization stopping structure and the second planarization stopping structure, the planarization using a slurry having a basic pH if the curvature of the surface formed is a concave curvature, the planarization using the slurry having a neutral pH if the curvature of the surface formed has a convex curvature.

16. The method of claim 15 wherein the curvature is the convex curvature.

17. The method of claim 16 wherein the step of performing the planarization further includes:
   performing a chemical mechanical planarization (CMP) with the slurry having a pH adjusted to provide a low removal rate.

18. The method of claim 16 wherein the CMP uses a soft pad.

19. The method of claim 15 wherein the curvature is the concave curvature.

20. The method of claim 19 wherein the step of performing the planarization further includes:
   performing a chemical mechanical planarization (CMP) with the slurry having a pH adjusted to provide a high removal rate.

21. The method of claim 19 wherein the CMP uses a hard pad.

22. The method of claim 21 wherein the hard pad includes polyurethane.

23. The method of claim 15 wherein the planarization uses a hard pad if the curvature of the surface formed is a concave curvature and wherein the planarization uses a soft pad if the curvature of the surface formed has a convex curvature.

* * * * *